United States Patent
Saita et al.

[11] Patent Number: 5,370,473
[45] Date of Patent: Dec. 6, 1994

[54] CONNECTING ARRANGEMENT FOR AUTOMOTIVE REAR WHEEL STEERING UNIT

[75] Inventors: Norihiro Saita; Torahiko Koshiba, both of Atsugi, Japan

[73] Assignee: Atsugi Unisia Corporation, Atsugi, Japan

[21] Appl. No.: 22,089

[22] Filed: Feb. 25, 1993

[30] Foreign Application Priority Data

Feb. 26, 1992 [JP] Japan .................. 4-008715[U]

[51] Int. Cl.$^5$ .................... B25G 3/00; B62D 5/06
[52] U.S. Cl. ........................... 403/376; 403/377; 403/378; 403/379; 74/526; 180/140
[58] Field of Search ............. 403/13, 14, 376, 377, 403/378, 379; 74/498, 526; 180/140

[56] References Cited

U.S. PATENT DOCUMENTS

| | | | |
|---|---|---|---|
| 2,916,099 | 12/1959 | Bergmann et al. | 180/140 |
| 3,391,953 | 7/1968 | Jordan | 403/376 |
| 4,647,241 | 3/1987 | Weber | 403/378 |
| 4,752,078 | 6/1988 | Ogura et al. | 180/140 |
| 4,881,748 | 11/1989 | Sano et al. | 180/140 |
| 4,899,611 | 2/1990 | Pinna | 403/14 |
| 5,078,018 | 1/1992 | Saita et al. | 74/89.14 |
| 5,193,638 | 3/1993 | Fujio et al. | 180/140 |
| 5,236,057 | 8/1993 | Takehara et al. | 180/140 |
| 5,289,891 | 3/1994 | Sugiyama | 180/140 |

*Primary Examiner*—Richard A. Bertsch
*Assistant Examiner*—Howard R. Richman
*Attorney, Agent, or Firm*—Foley & Lardner

[57] ABSTRACT

A connecting arrangement for an automotive rear wheel steering unit is provided which is adapted for connecting an output shaft of a rear wheel steering gear train and a steering rod for steering rear wheels. The connecting arrangement includes a tapered portion formed on the output shaft, a tapered bore formed in the steering rod for receiving the tapered portion, and a fastener for locking the tapered portion of the output shaft to the tapered bore of the steering rod. With these arrangements, easy connecting operation is established with high mounting accuracy.

7 Claims, 4 Drawing Sheets

CONNECTING ARRANGEMENT FOR AUTOMOTIVE REAR WHEEL STEERING UNIT

BACKGROUND OF THE INVENTION

1. Field of the Invention

The present invention relates generally to a rear wheel steering unit for an automotive vehicle. More particularly, the invention is directed to an improvement on a connecting arrangement for connecting between an output shaft of a rear wheel steering gear train and a steering rod for steering rear wheels.

2. Description of the Prior Art

It is current practice to incorporate a four-wheel steering (4WS) system into automotive vehicles for improving cornering stability.

U.S. Pat. No. 5,078,018, issued on Jan. 7, 1992, assigned to the same assignee of this application, discloses a conventional electrically-operated rear wheel steering unit. This steering unit includes an electric motor-operated gear train which has an output shaft operable to rotate eccentrically with respect to an input shaft, which eccentric movement, in turn, causes a steering rod to be displaced laterally for steering rear wheels.

The above prior art rear wheel steering system, however, encounters a drawback in that the output shaft is press-fitted into a bore formed in the steering rod for establishing tight engagement therebetween with high accuracy, therefore, it is necessary to form a flanged portion on the output shaft for facilitating the press-fitting operation. This results in machining costs as well as assembling processes being increased.

SUMMARY OF THE INVENTION

It is therefore a principal object of the present invention to avoid the disadvantages of the prior art.

It is another object of the present invention to provide a connecting arrangement for a rear wheel steering unit which is capable of securing an output shaft of a rear wheel steering gear train to a steering rod linked to rear wheels easily with high mounting accuracy.

According to one aspect of the present invention, there is provided a connecting apparatus for an automotive rear wheel steering unit which comprises a steering rod displaceable to steer rear wheels of an automotive vehicle and having a tapered bore therein, an operating pin movable to displace the steering rod and having a tapered portion fitted into the tapered bore of the steering rod, and a fastening means for fastening the steering rod and the operating pin to each other to hold engagement between the tapered portion and the tapered bore.

In the preferred mode, the fastening means may be provided with a fixing member and a screw. The operating pin has a through hole extending along a center line thereof. The screw is fastened to the fixing member through the through hole of the operating pin to lock the operating pin to the steering rod. Additionally, the fixing member may be made of a member substantially C-shaped in cross section. The fixing member has an opening in a first wall section for receiving the operating pin therein and an internal threaded section, in a second wall section opposite the first wall section, for engaging the screw. The fixing member engages a peripheral surface of the steering rod while the opening and the internal threaded portion both are aligned with the tapered bore of the steering rod. Alternatively, the fixing member may be provided with a hollow cylindrical member which has therein an opening and an internal threaded section for engaging the screw. The steering rod is inserted into the hollow cylindrical member so that the tapered bore is in alignment with the opening and the internal threaded portion.

Further, the fastening means may be provided with a fixing member and an external threaded portion. The fixing member has an opening and an internal threaded portion in alignment with the opening. The external threaded portion is provided on a top end of the tapered portion of the operating pin. The operating pin is inserted into the tapered bore of the steering rod through the opening of the fixing member so that the external threaded portion engages the internal threaded portion of the fixing member.

BRIEF DESCRIPTION OF THE DRAWINGS

The present invention will be understood from the detailed description given hereinbelow and from the accompanying drawings of the preferred embodiments which are given for explanation and understanding only and are not intended to imply limitations to the invention.

In the drawings:

FIG. 3 (B) is a partial cross sectional view taken along the line III—III in FIG. 3(A).

FIG. 4 (B) is a partial cross sectional view taken along the line IV—IV in FIG. 4 (A).

FIG. 4 (C) is a partial cross sectional view taken along the line V—V in FIG. 4 (B).

DESCRIPTION OF THE PREFERRED EMBODIMENT

Figure 1A:
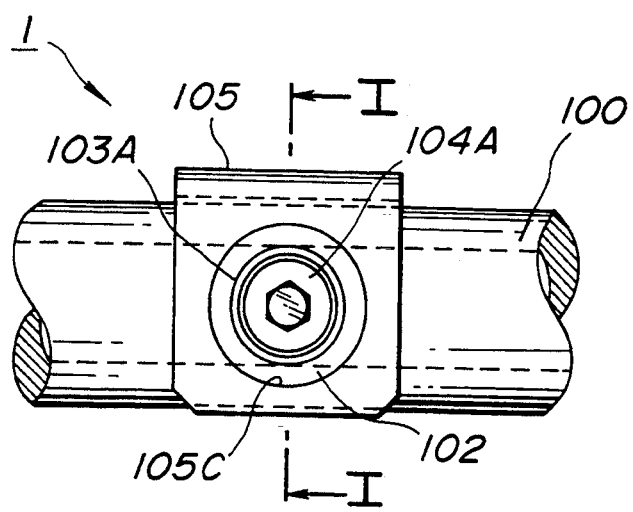
FIG. 1(A) is a top plan view which shows a connecting arrangement for an automotive rear wheel steering unit according to the present invention.
Figure 1B:
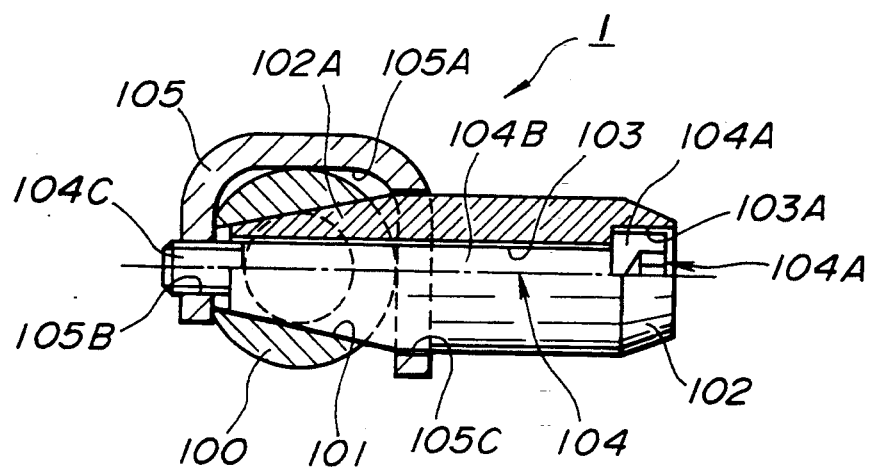
FIG. 1(B) is a partial cross sectional view taken along the line I—I in FIG. 1(A).
Figure 2:
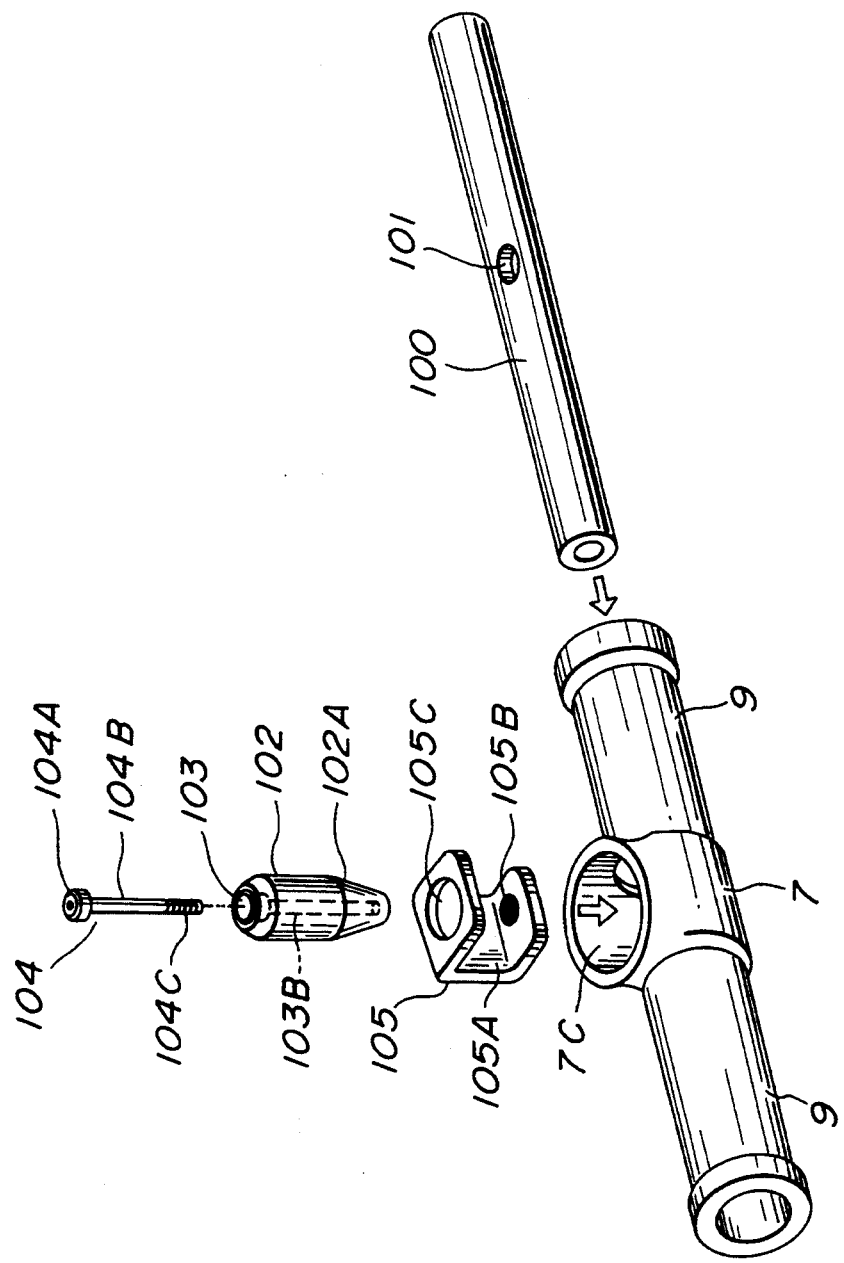
FIG. 2 is an exploded perspective view which shows a connecting arrangement of the present invention.

Referring now to the drawings, wherein like numbers refer to like parts in the several views, particularly to FIGS. 1(A), 1(B), and 2, there is shown a connecting arrangement 1 for a rear wheel steering gear train according to the present invention. This connecting arrangement 1 includes generally an operating pin 102 (i.e., an output shaft of the rear wheel steering gear train) and a steering rod 100 linked to knuckle arms at both its ends to which rear wheels are rotatably attached. The operating pin 102 is driven by a worm gear (not shown) to move eccentrically with respect to rotation of the worm gear for displacing the steering rod 100 laterally. These arrangements are the same as disclosed in the above mentioned U.S. Pat. No. 5,078,018, the contents of which is herein incorporated by reference.

As can be seen in FIGS. 1(B) and 2, the steering rod 100 is made of a thick-walled hollow cylindrical member. A tapered fixing bore 101 is formed in a longitudinally central portion of the steering rod 100. The operating pin 102 includes a frustoconical, or tapered portion 102A contoured to the fixing bore 101 and a through hole 103 extending along the center line thereof.

The through hole 103 includes a large diameter section, or counterbore 103A for receiving a head 104A of a bolt 104 completely and a small diameter section, or bolt hole 103B into which a bolt shaft 104B is inserted. On a top end portion of the bolt shaft 104B, an external threaded portion 104C is formed.

The connecting arrangement 1 further includes a fastening member 105 of substantially C-shaped cross section and a cylindrical rod casing 9. The fastening member 105 has an internal threaded portion 105B, in a lower wall (i.e., the left wall as viewed in FIG. 1(B)), for engaging the external threaded portion 104C of the bolt 104 and a fixing opening 105C, in an upper wall (i.e., the right wall as viewed in FIG. 1(B)), in alignment with the internal threaded portion 105B for fixing the operating pin 102. The rod casing 9 includes a housing portion 7 which has an opening 7C and defines a chamber for accommodating the fastening member 105.

Referring to FIG. 2, assembling processes of the connecting arrangement 1 will be described hereinafter.

First, the fastening member 105 is disposed within the housing portion 7 through the opening 7C. The steering rod 100 is then inserted into the rod casing 9 so as to engage an inner wall 105A of the fastening member 105 while the fixing bore 101 of the steering rod 100 coincides with the fixing opening 105C.

Next, the operating pin 102 is fitted into the fixing bore 101 through the fixing opening 105C of the fastening member 105. The bolt 104 is then screwed into the threaded portion 105B through the through hole 103 of the operating pin 102 to fasten the operating pin 102 and the steering rod 100 together without any play as shown in FIGS. 1(A) and 1(B). It will be appreciated that an arrangement including the fastening member 105 and the bolt 104 serves to establish tight engagement between the operating pin 102 and the steering rod 100 with high mounting accuracy therebetween.

Figure 3A:
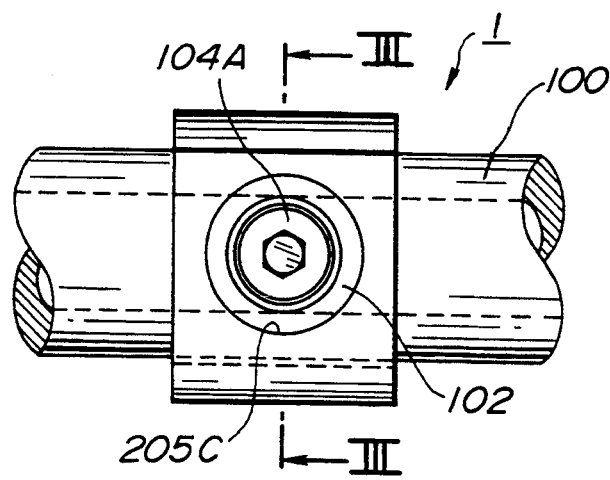
FIG. 3 (A) is a top plan view which shows a connecting arrangement of an alternative embodiment.
Figure 3B:
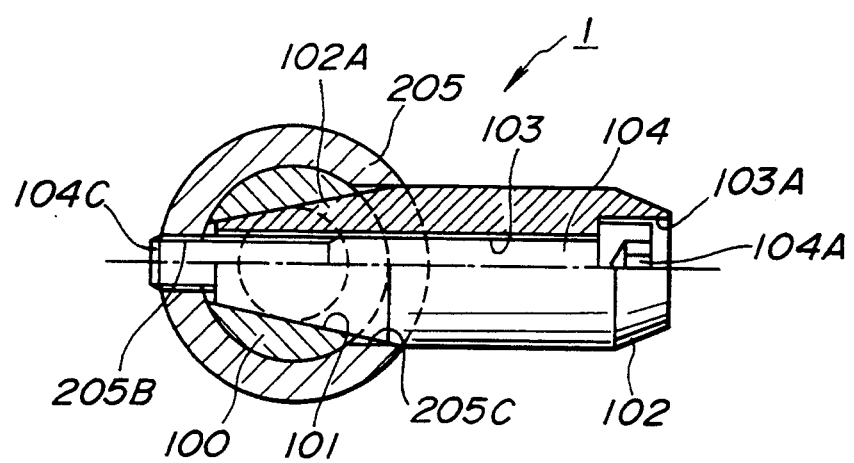

Referring to FIGS. 3(A) and 3(B), there is shown an alternative embodiment according to the present invention.

The connecting arrangement 1 of this embodiment includes a hollow cylindrical fastening member 205. The fastening member 205 has the inner diameter which is substantially the same as the outer diameter of the steering rod 100 so that the steering rod 100 is fitted into the fastening member 205 without any play. An internal threaded portion 205B and a fixing opening 205C are formed in the fastening member 205 in alignment with each other. Other elements are the same as the above stated first embodiment, therefore, the explanation thereof in detail will be omitted here.

Figure 4A:
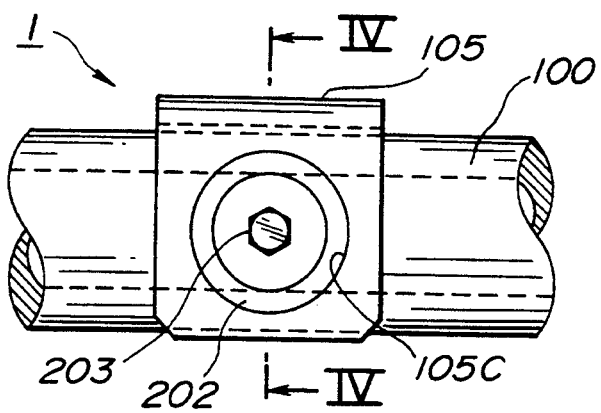
FIG. 4 (A) is a top plan view which shows a connecting arrangement of a third embodiment.
Figure 4B:
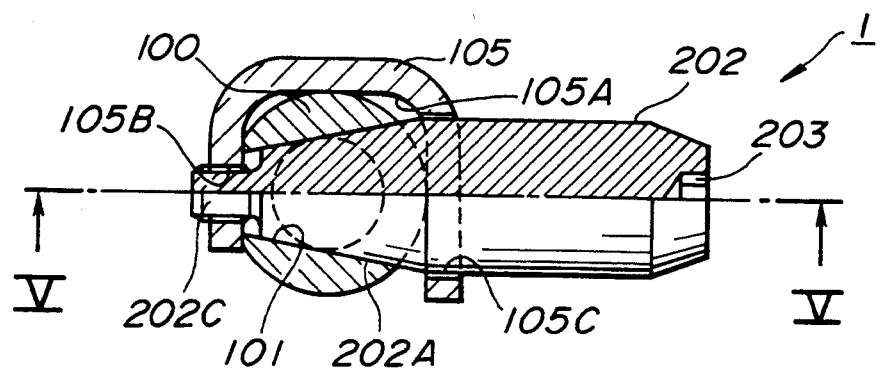
Figure 4C:
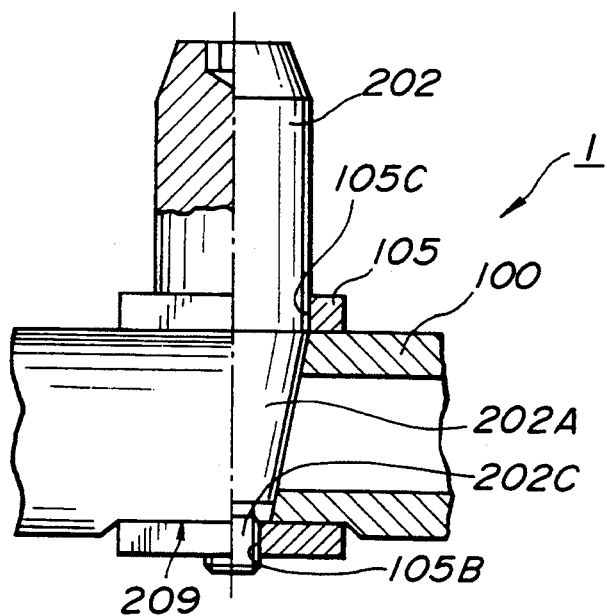

Referring to FIGS. 4(A), 4(B), and 4(C), there is shown a third embodiment of the connecting arrangement 1.

The connecting arrangement 1 of this embodiment includes an operating pin 202 which has a projecting portion 202C in place of the bolt 104 utilized in the above embodiments and a recessed portion 203 such as a hexagon socket in an end opposite the projecting portion 202C. The projecting portion 202C is provided on a top end of a tapered portion 202A and has external threads thereon for engaging the internal threaded portion 105B. Additionally, a recessed portion 209 is, as best can be seen in FIG. 4(C), formed in an outer surface of the steering rod 100. The recessed portion 209 has a substantially flat surface engaging the lower wall of the fastening member 105 for facilitating alignment of the tapered fixing bore 101 of the steering rod 100 with the fixing opening 105C of the fastening member 105.

In this third embodiment, the C-shaped fastening member 105 may alternatively be replaced with the hollow cylindrical fastening member 205. In this case, it is preferable that the recessed portion 209 is not formed in the steering rod 100.

In assembling, the steering rod 100 is first inserted into the rod casing 9 so that the recessed portion 209 is located within the housing portion 7. The fastening member 105 is set to the steering rod 100 to have the lower wall of the fastening member 105 engage the recessed portion 209 tightly so that the internal threaded portion 105B and the fixing opening 105C coincide with the fixing bore 101 of the steering rod 100. Afterwards, the operating pin 202 is fitted into the fixing bore 101 through the opening 7C of the housing portion 7 to screw the projecting portion 202C into the threaded portion by turning the operating pin 202 by means of a hexagon socket screw key (not shown).

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For example, in order to prevent the bolt 104 and/or the operating pin from being loosened, an adhesive may be applied or a detent pin may be inserted between the bolt head 104A and the counterbore 103. Additionally, in the above third embodiment, an adhesive may be applied between the operating pin 202 and the fixing opening 105C. Further, in place of the threaded portion 105B of the fastening member 105, a nut may be used. In this case, a hole is preferably formed in a bottom of the housing portion 7 for allowing an operator to easily fasten the bolt 104 and the nut together. Moreover, punching may be made between the nut and the threaded portion 104C of the bolt 104.

What is claimed is:

1. A connecting apparatus for an automotive rear wheel steering unit comprising:
   a steering rod displaceable to steer rear wheels of an automotive vehicle, said steering rod having a tapered bore therein;
   an operating pin movable to displace said steering rod, said operating pin having a tapered portion fitted into the tapered bore of said steering rod; and
   fastening means for fastening said steering rod and said operating pin to each other to hold engagement between the tapered portion and the tapered bore.

2. A connecting apparatus as set forth in claim 1, wherein said fastening means is provided with a fixing member and a screw, said operating pin having a through hole extending along a center line thereof, said screw being fastened to said fixing member through the hole of said operating pin to lock said operating pin to said steering rod.

3. A connecting apparatus as set forth in claim 2, wherein said fixing member is substantially C-shaped in cross section, said fixing member having an opening in a first wall section for receiving said operating pin therein and an internal threaded section, in a second wall section opposite the first wall section, for engaging the screw, said fixing member engaging a peripheral surface of said steering rod while the opening and the internal threaded portion are aligned with the tapered bore of the steering rod.

4. A connecting apparatus as set forth in claim 2, wherein said fixing member is provided with a hollow cylindrical member which has therein an opening and an internal threaded section for engaging said screw, said steering rod being inserted into said hollow cylindrical member so that the tapered bore is in alignment with the opening and the internal threaded portion.

5. A connecting apparatus as set forth in claim 1, wherein said fastening means is provided with a fixing member and said operating pin includes an external threaded portion, said fixing member having an opening and an internal threaded portion in alignment with the opening, said external threaded portion being provided on a top end of the tapered portion of said operating pin, said operating pin being inserted into the tapered bore of said steering rod through the opening of the fixing member so that the external threaded portion engages the internal threaded portion of the fixing member.

6. A connecting apparatus as set forth in claim 5, wherein said fixing member is provided with a hollow cylindrical member.

7. A connecting apparatus as set forth in claim 5, wherein said fixing member is provided with a substantially C-shaped member.

* * * * *